(12) United States Patent
Kim et al.

(10) Patent No.: US 10,790,487 B2
(45) Date of Patent: Sep. 29, 2020

(54) BATTERY PACK HAVING BOTTOM WITH DRAINAGE

(71) Applicant: LG CHEM, LTD., Seoul (KR)

(72) Inventors: Hyeon-Kyu Kim, Daejeon (KR); Bum-Hyun Lee, Daejeon (KR); Jae-Ki Lee, Daejeon (KR); Yeo-Joo Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 217 days.

(21) Appl. No.: 16/077,166

(22) PCT Filed: Oct. 31, 2017

(86) PCT No.: PCT/KR2017/012164
§ 371 (c)(1),
(2) Date: Aug. 10, 2018

(87) PCT Pub. No.: WO2018/080280
PCT Pub. Date: May 3, 2018

(65) Prior Publication Data
US 2019/0027719 A1    Jan. 24, 2019

(30) Foreign Application Priority Data

Oct. 31, 2016   (KR) .................. 10-2016-0143387

(51) Int. Cl.
H01M 2/10    (2006.01)
H01M 2/02    (2006.01)
(Continued)

(52) U.S. Cl.
CPC ....... H01M 2/1022 (2013.01); H01M 2/0245 (2013.01); H01M 2/0247 (2013.01);
(Continued)

(58) Field of Classification Search
CPC . H01M 2/1022; H01M 2/1016; H01M 10/052
See application file for complete search history.

(56) References Cited

U.S. PATENT DOCUMENTS 8,883,336 B2 * 11/2014 Kim ................... H01M 10/625
429/99
9,722,238 B2   8/2017 Cho et al.
(Continued)

FOREIGN PATENT DOCUMENTS

CN         105782132 A  *  7/2016
EP             2343752 A2    7/2011
(Continued)

OTHER PUBLICATIONS

Web Archive of United States Environmental Protection Agency web page, "Particulate Matter (PM) Basics," Oct. 1, 2016.*
(Continued)

*Primary Examiner* — Barbara L Gilliam
*Assistant Examiner* — George Kim
(74) *Attorney, Agent, or Firm* — Birch, Stewart, Kolasch & Birch, LLP

(57) ABSTRACT

Disclosed is a battery pack, which includes at least one battery module and a pack case for packaging the at least one battery module, and the battery pack includes a case base configured to support the at least one battery module, a case body coupled to the case base to accommodate the at least one battery module, and a case cover coupled to the case body to cover the case body, wherein the case base and the case body are sealed to each other and the case body and the case cover are sealed to each other, respectively, by means of a sealant member along a rim thereof.

11 Claims, 9 Drawing Sheets

(51) Int. Cl.
*H01M 2/36* (2006.01)
*H01M 10/6551* (2014.01)
*H01M 2/04* (2006.01)
*H01M 2/34* (2006.01)
*H01M 10/42* (2006.01)

(52) U.S. Cl.
CPC .......... *H01M 2/04* (2013.01); *H01M 2/1005* (2013.01); *H01M 2/1016* (2013.01); *H01M 2/1072* (2013.01); *H01M 2/1077* (2013.01); *H01M 2/34* (2013.01); *H01M 2/364* (2013.01); *H01M 10/425* (2013.01); *H01M 10/6551* (2015.04)

(56) References Cited

U.S. PATENT DOCUMENTS

| | | | |
|---|---|---|---|
| 2001/0029905 A1* | 10/2001 | Kobayashi | F23D 14/68 122/13.01 |
| 2005/0058890 A1* | 3/2005 | Brazell | B25F 5/006 429/99 |
| 2006/0269836 A1 | 11/2006 | Yamamoto et al. | |
| 2012/0164504 A1 | 6/2012 | Takashina et al. | |
| 2014/0308552 A1* | 10/2014 | Kim | H01M 2/1077 429/82 |
| 2016/0126536 A1 | 5/2016 | Cho et al. | |
| 2018/0076427 A1 | 3/2018 | Choi et al. | |

FOREIGN PATENT DOCUMENTS

| | | |
|---|---|---|
| EP | 2 410 590 B1 | 7/2013 |
| EP | 3392928 A1 | 10/2018 |
| JP | 2006-210116 A | 8/2006 |
| JP | 2011-216366 A | 10/2011 |
| JP | 2013-196851 A | 9/2013 |
| JP | 2015-137008 A | 7/2015 |
| JP | 2016-122530 A | 7/2016 |
| JP | 2016-131485 A | 7/2016 |
| KR | 10-2014-0002428 A | 1/2014 |
| KR | 10-1369044 B1 | 3/2014 |
| KR | 10-2014-0074151 A | 6/2014 |
| KR | 10-2014-0093124 A | 7/2014 |
| KR | 10-2016-0047152 A | 5/2016 |
| KR | 10-2016-0051954 A | 5/2016 |

OTHER PUBLICATIONS

International Search Report (PCT/ISA/210) issued in PCT/KR2017/012164, dated Feb. 26, 2018.

* cited by examiner

BATTERY PACK HAVING BOTTOM WITH DRAINAGE

TECHNICAL FIELD

The present disclosure relates to a battery pack.

The present application claims priority to Korean Patent Application No. 10-2016-0143387 filed on Oct. 31, 2016 in the Republic of Korea, the disclosures of which are incorporated herein by reference.

BACKGROUND ART

A secondary battery, which is easily applied to various product groups and has electrical characteristics such as high energy density, is universally applied not only for a portable device but also for an electric vehicle (EV), a hybrid electric vehicles (HEV) or the like, which is driven by an electric driving source. The secondary battery is attracting attention as a new environment-friendly energy source for improving energy efficiency since it gives a primary advantage of reducing the use of fossil fuels and also does not generate by-products by the use of energy at all.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, depending on various voltage and capacity requirements, the battery pack including at least one battery module may be used for a home, or battery racks including at least one battery pack may be combined to configure a power storage device for industrial use.

In the conventional battery pack, a waterproof and dustproof structure capable of preventing foreign matter such as moisture and dust from penetrating from the outside is particularly important due to characteristics of a battery, which is a secondary battery. In particular, when the battery pack is used as a home energy storage device, the waterproof and dustproof structure may become more important for the safety of a user or the like.

Therefore, there is a need to search for a method of providing a battery pack having a waterproof and dustproof structure with better airtightness and efficiency.

DISCLOSURE

Technical Problem

The present disclosure is directed to providing a battery pack having a waterproof and dustproof structure with better airtightness and efficiency.

Technical Solution

In one aspect of the present disclosure, there is provided a battery pack, which includes at least one battery module and a pack case for packaging the at least one battery module, the battery pack comprising: a case base configured to support the at least one battery module; a case body coupled to the case base to accommodate the at least one battery module; and a case cover coupled to the case body to cover the case body, wherein the case base and the case body are sealed to each other and the case body and the case cover are sealed to each other, respectively, by means of a sealant member along a rim thereof.

The case body may include: a first inner case configured to fix the at least one battery module; an outer case configured to surround the first inner case and form an accommodation space for accommodating the at least one battery module; and a second inner case mounted to an upper side of the outer case and coupled to the case cover.

The second inner case may be mutually sealed to the outer case by means of the sealant member.

The second inner case may be mutually sealed to the case cover by means of the sealant member.

The outer case may be mutually sealed to the case base by means of the sealant member.

The case base may include a base mount mounted to the at least one battery module; and drainage holes provided at both sides of the base mount and formed to have a step from the base mount.

An upper surface of the base mount may be inclined downwards toward the drainage hole.

The battery pack may further comprise at least one mesh unit mounted to the drainage hole.

The at least one mesh unit may include: a first mesh frame mounted to an upper side of the drainage hole; a first mesh net mounted to the first mesh frame; a second mesh frame mounted to a lower side of the drainage hole; and a second mesh net mounted to the second mesh frame and disposed opposite to the first mesh net.

The first mesh net and the second mesh net may be arranged with mutually alternating net structures.

The first mesh net and the second mesh net may be spaced apart from each other by at least 2 mm.

The at least one mesh unit may include a dust-protecting filter provided between the first mesh net and the second mesh net.

The dust-protecting filter may have a volume corresponding to the space between the first mesh net and the second mesh net.

The dust-protecting filter may filter off foreign matter including dust with a size of 10 μm or above.

The battery pack may be a home energy storage device.

Advantageous Effects

According to various embodiments as above, it is possible to provide a battery pack having a waterproof and dustproof structure with better airtightness and efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
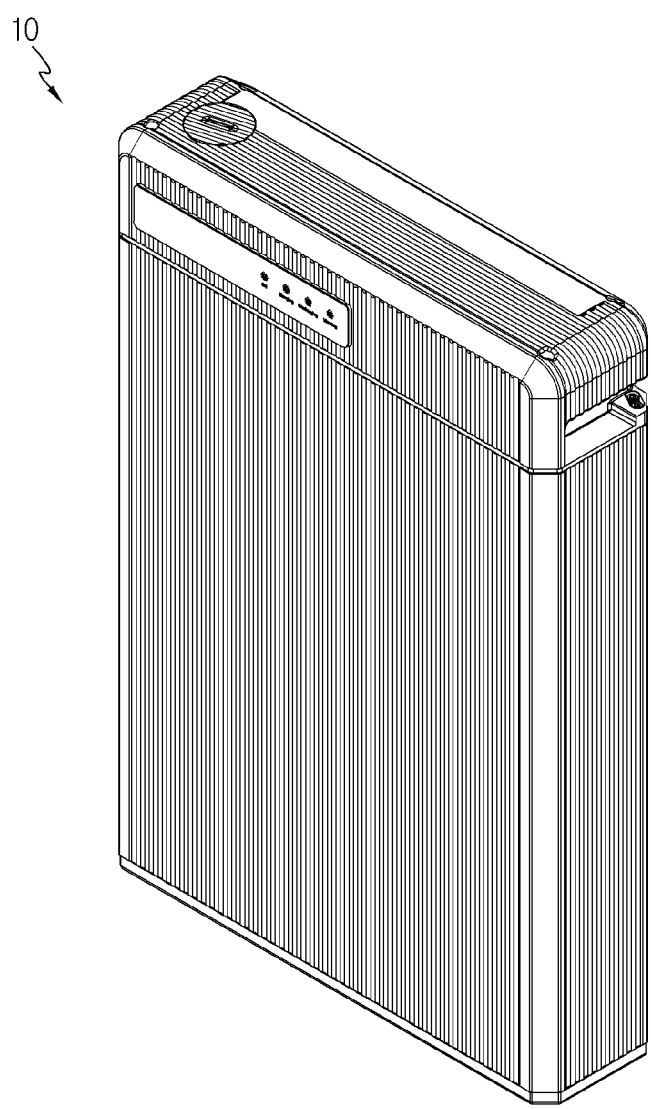
FIG. 1 is a diagram for illustrating a battery pack according to an embodiment of the present disclosure.
Figure 2:
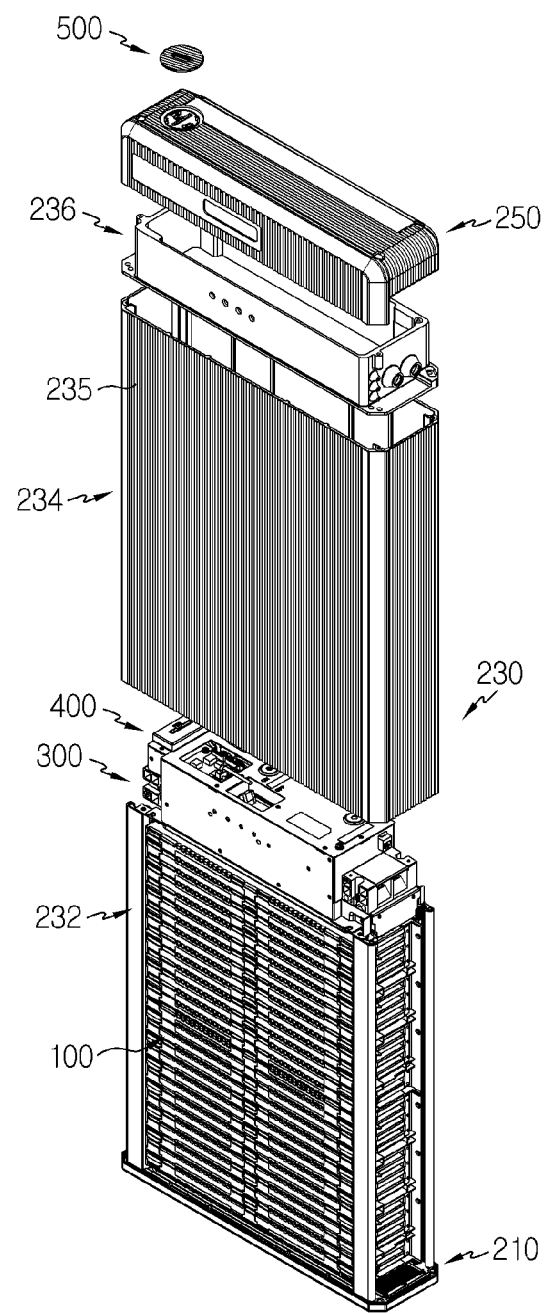
FIG. 2 is an exploded perspective view showing the battery pack of FIG. 1.
Figure 3:
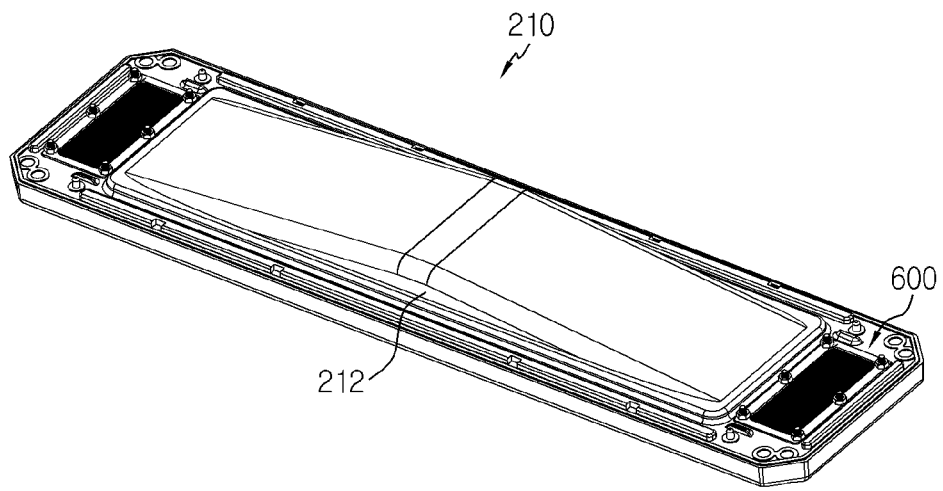
FIG. 3 is a perspective view showing a case base of a pack case, employed at the battery pack of FIG. 2.
Figure 4:
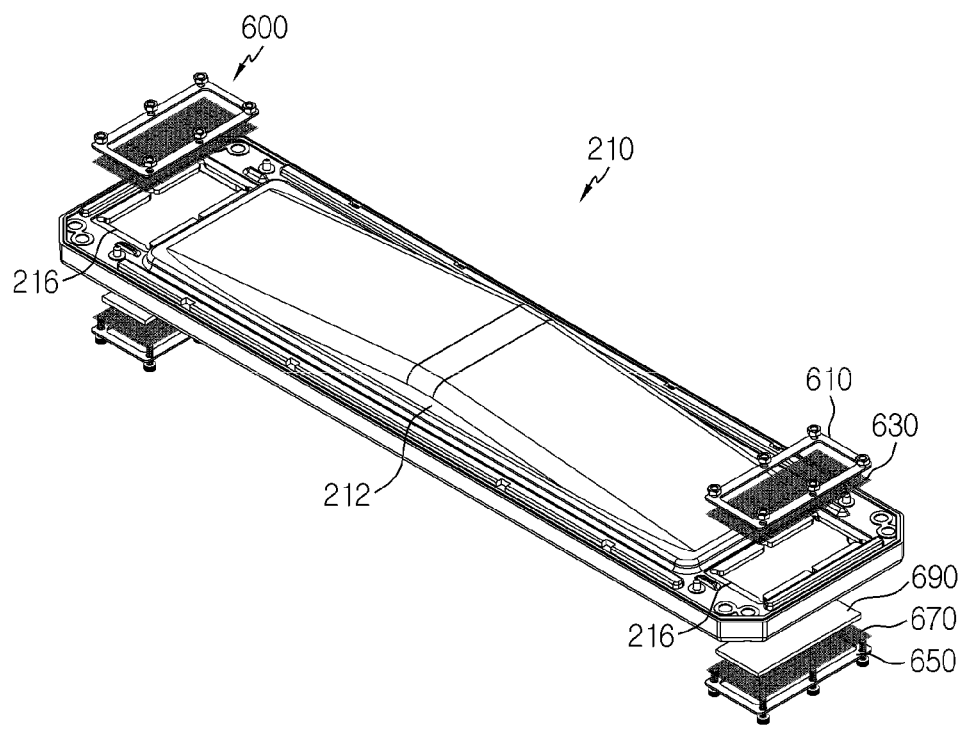
FIG. 4 is a diagram for illustrating a mesh unit mounted to the case base of FIG. 3.
Figure 5:
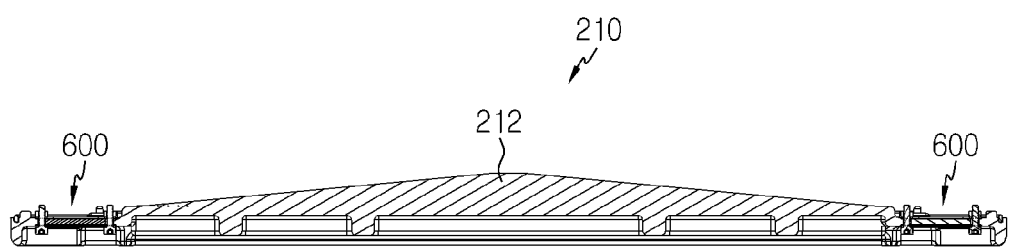
FIG. 5 is a cross-sectional view showing the case base of FIG. 3.
Figure 6:
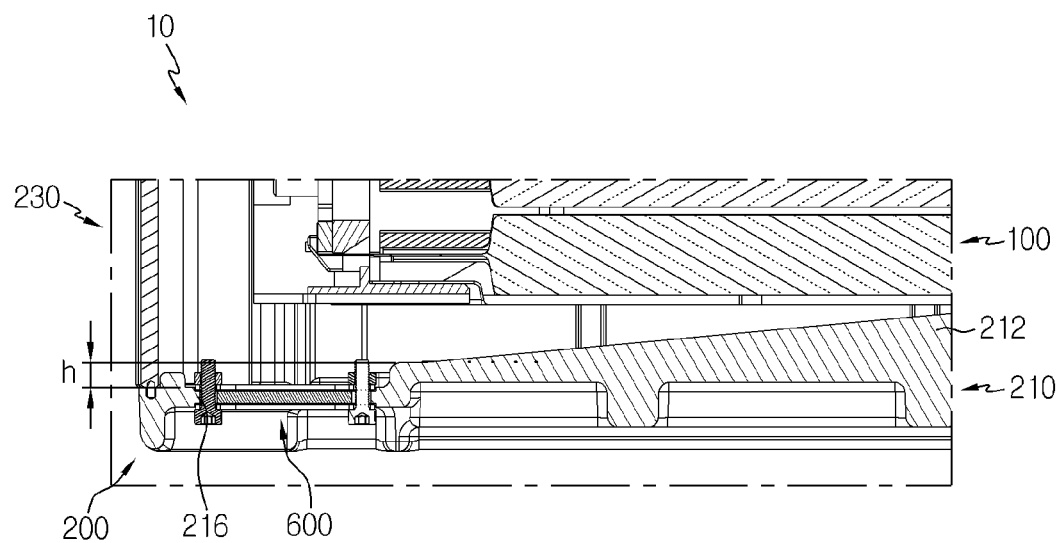
FIG. 6 is a sectional view showing a lower portion of the battery pack of FIG. 1.
Figure 7:
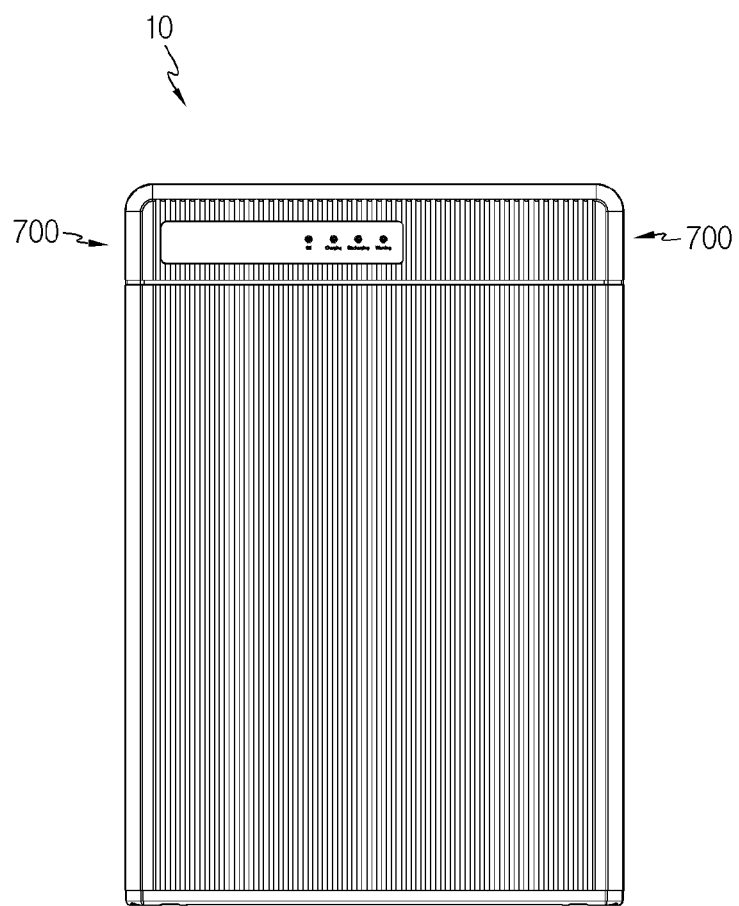
FIG. 7 is a front view showing the battery pack of FIG. 1.
Figure 8:
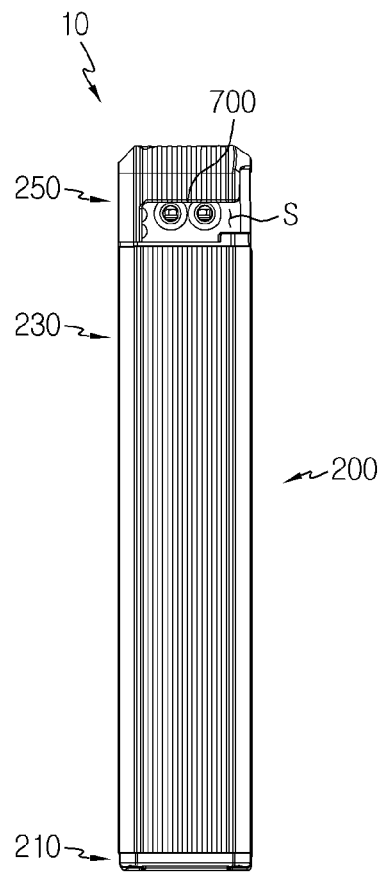
FIG. 8 is a side view showing the battery pack of FIG. 1.

FIG. 1 is a diagram for illustrating a battery pack according to an embodiment of the present disclosure, FIG. 2 is an exploded perspective view showing the battery pack of FIG. 1, FIG. 3 is a perspective view showing a case base of a pack case, employed at the battery pack of FIG. 2, FIG. 4 is a diagram for illustrating a mesh unit mounted to the case base of FIG. 3, FIG. 5 is a cross-sectional view showing the case base of FIG. 3, FIG. 6 is a sectional view showing a lower portion of the battery pack of FIG. 1, FIG. 7 is a front view showing the battery pack of FIG. 1, and FIG. 8 is a side view showing the battery pack of FIG. 1.

Referring to FIGS. 1 to 8, a battery pack 10 is an energy source and may be used as an industrial or home energy storage device. Also, the battery pack 10 may be used as an energy source for a vehicle such as an electric vehicle or a hybrid electric vehicle, which have recently been attracting attention. Hereinafter, this embodiment will be described based on the case where the battery pack 10 is used as a home energy storage device.

The battery pack 10 may include a battery module 100, a pack case 200, a BMS unit 300, a memory slot unit 400, a slot cover 500, a mesh unit 600 and a handle 700.

At least one battery module 100, or a plurality of battery modules 100, may be provided. The following description is based on the case where the battery module 100 is provided in plural. The plurality of battery modules 100 may be stacked along a vertical direction of the battery pack 10 so as to be electrically connected to each other.

Each of the plurality of battery modules 100 may include at least one battery cell. The at least one battery cell may be a secondary battery, for example a pouch-type secondary battery.

The pack case 200 may package the at least one battery module 100, or the plurality of battery modules 100 in this embodiment. The pack case 200 may include a case base 210, a case body 230 and a case cover 250.

The case base 210 forms a bottom of the pack case 200 and may support the plurality of battery modules 100. The case base 210 may include a base mount 212 and a drainage hole 216.

The base mount 212 forms an appearance of the case base 210 and may support the plurality of battery modules 100. For this, a battery module 100 disposed on the lowermost side among the plurality of battery modules 100 may be mounted to the base mount 212.

The base mount 212 may have an upper surface that is inclined downward as being closer to the drainage hole 216, explained later. In other words, the upper surface of the base mount 212 may be inclined downward from the center to both ends. Accordingly, even if water or foreign substances penetrate into the upper surface of the base mount 212, the penetrating water or foreign substances may easily flow down to the drainage hole 216, explained later.

In addition, a channel elongating toward the drainage hole 216, explained later, may be provided at the base mount 212. The channel may be provided at an upper surface of the base mount 212 to guide smooth movement of gas such as smoke toward the drainage hole 216, explained later.

The channel may be provided in a zigzag form at the upper surface of the base mount 212 to ensure a longer channel path. If the channel path is ensured, when a flame occurs within the battery module 10, it is possible to effectively prevent or delay the movement of the flame toward the drainage hole 216, explained later, while guiding the movement of the gas along the channel. Accordingly, even though a flame occurs in the battery module 10, it is possible to effectively prevent or delay that the flame is exposed out of the battery module 10 through the channel.

Here, the channel may be prepared by forming a plurality of barrier structures at the upper surface of the base mount 212 or may have a groove structure formed at the upper surface of the base mount 212. The channel may have other structure as long as it is able to restrict the movement of the flame while guiding the gas to move toward the drainage hole 216, explained later, from the base mount 212.

The drainage hole 216 communicates with the outside of the pack case 200 and may be provided at both sides of the base mount 212. When water penetrates into the pack case 200, the drainage hole 216 may discharge the penetrating water out of the pack case 200.

The drainage hole 216 may be provided below the upper surface of the base mount 212 to form a step with the base mount 212 as much as a predetermined height h. If water penetrates at the upper side of the pack case 200, the water penetrating at the upper side of the pack case 200 may flow down below the pack case 200 along an inner wall of the pack case 200 and then be discharged out of the pack case 200 through the drainage hole 216. Here, since the drainage hole 216 is provided below the upper surface of the base mount 212, it is possible to prevent the water flowing on the upper inner wall of the pack case 200 from penetrating into the upper surface of the base mount 212.

The case body 230 forms the most appearance of the pack case 200 and may be coupled to the case base 210 to accommodate the at least one battery module 100, or the plurality of battery modules 100 in this embodiment.

The case body 230 may include a first inner case 232, an outer case 234 and a second inner case 236.

The first inner case 232 is to fix the at least one battery module 100, or the plurality of battery modules 100 in this embodiment, and may include four fixing support bars capable of fixing the plurality of battery modules 100 at four corners of the plurality of battery modules 100 stacked in the vertical direction of the battery pack 10.

The outer case 234 surrounds the first inner case 232 and may form an accommodation space for accommodating the at least one battery module 100, or the plurality of battery modules 100 in this embodiment.

The outer case 234 may have a substantially hexahedral shape to be opened in the vertical direction of the battery pack 10. The outer case 234 may be integrally formed by extrusion molding. In other words, the outer case 234 may be formed as a single member to cover all of a front portion, a rear portion and both side portions of the plurality of battery modules 100. The outer case 234 may also be formed as a combination of two members, without being limited to the above.

The outer case 234 may be mounted to the first inner case 232 by sliding along the vertical direction of the plurality of battery modules 100. In detail, the outer case 234 may be mounted to the four fixing support bars of the first inner case 232 by sliding.

In this embodiment, since the outer case 234 is mounted to the first inner case 232 by sliding as described above, it is possible to omit an additional bolting member for coupling these members or greatly reduce the number of bolting members.

After being mounted by sliding, the outer case 234 may be sealed with the case base 210 along an edge thereof by means of a sealant member to ensure airtightness with the case base 210. Here, the sealant member may be made of any material capable of ensuring airtightness, for example urethane foam. In other words, the case body 230 and the case base 210 may be sealed to each other by means of the sealant member.

The outer case 234 may include a heat-dissipating bead 235.

The heat-dissipating bead 235 is provided at an outer surface of the outer case 234 and may be provided in plural along a length direction of the outer case 234. The plurality of heat-dissipating beads 235 may effectively dissipate the heat inside the pack case 200 out of the pack case 200 when heat is generated in the pack case 200.

The second inner case 236 is mounted above the outer case 234 and may cover the BMS unit 300, explained later. The second inner case 236 may be coupled to the case cover 250, explained later.

The second inner case 236 may be sealed with the outer case 234 by means of the sealant member to ensure airtightness with the outer case 234. In addition, the second inner case 236 may be sealed with the case cover 250, explained later, by means of the sealant member to ensure airtightness with the case cover 250, explained later.

As described above, in this embodiment, the second inner case 236 and the outer case 234 may be sealed to each other, the second inner case 236 and the case cover 250, explained later, may be sealed to each other, and the outer case 234 and the case base 210 may be sealed to each other, respectively. Accordingly, in this embodiment, sealing by the sealant member is performed on at least three points among the case base 210, the case body 230 and the case cover 250, explained later, of the pack case 200, and thus it is possible to secure more rigid airtightness of the pack case 200.

The case cover 250 forms an upper side of the pack case 200 and may be coupled to the case body 230 to cover the case body 230. The case cover 250 may form a space groove S when the case body 230 is coupled thereto. The space groove S is a predetermined space which is exposed only at both side portions and a rear portion of the battery pack 10, and a handle 700, explained later, may be provided thereto. This will be described later in more detail in relation to the handle 700.

The BMS unit 300 is provided in the pack case 200 and used for controlling the at least one battery module 100, or the plurality of battery modules 100 in this embodiment. For this, the BMS unit 300 may be electrically connected to the plurality of battery modules 100.

The memory slot unit 400 is electrically connected to the BMS unit 300, and a memory unit for firmware update of the BMS unit 300 of the battery pack 10 may be inserted therein. Here, the memory unit is a medium used for the firmware update and may be an SD card.

The memory slot unit 400 is disposed between the BMS unit 300 and the pack case 200 inside the pack case 200 and may be partially exposed out of the pack case 200 when the memory unit is inserted.

The slot cover 500 may expose the memory slot unit 400 out of the case cover 250 when the memory unit is inserted by a user or the like. For this, the slot cover 500 may be detachably mounted on the case cover 250. In detail, the slot cover 500 is provided to be rotatably in a horizontal direction of the case cover 250 and may be separated from the case cover 250 or fixed to the case cover 250 according to the rotation.

The mesh unit 600 is used to further ensure waterproofing or dustproofing of the battery pack 10, and at least one mesh pack 600 may be provided. Hereinafter, the present embodiment will be described based on the case where the mesh pack 600 is provided in a pair and respectively mounted to the drainage hole 216, respectively.

The mesh unit 600 may include a first mesh frame 610, a first mesh net 630, a second mesh frame 650, a second mesh net 670 and a dust-protecting filter 690.

The first mesh frame 610 may be mounted above the drainage hole 216. The first mesh frame 610 may fix the first mesh net 630, explained later, at an upper side of the drainage hole 216.

The first mesh net 630 is mounted to the first mesh frame 610 and may be disposed above the drainage hole 216. The first mesh net 630 has a net structure and may prevent foreign substances from penetrating into the pack case 200 from the outside of the pack case 200.

The second mesh frame 650 may be mounted below the drainage hole 216. The second mesh frame 650 may fix the second mesh net 670, explained later, at a lower side of the drainage hole 216.

The second mesh net 670 is mounted to the second mesh frame 650 and may be disposed below the underside of the drainage hole 216 to face the first mesh net 630.

The second mesh net 670 has a net structure, similar to the first mesh net 630, and may prevent foreign substances from penetrating into the pack case 200 from the outside of the pack case 200. As described above, in this embodiment, the mesh unit 600 may more reliably prevent foreign substances or the like from penetrating into the pack case 200 by means of a double net structure of the first mesh net 630 and the second mesh net 670.

The second mesh net 670 and the first mesh net 630 may be arranged with mutually alternating net structures for more reliable waterproofing or dustproofing. In other words, the net shape of the first mesh net 630 may be interlaced with the net shape of the second mesh net 670 in the vertical direction of the battery pack 10.

In addition, it is also possible that a plurality of mesh nets are provided, more than one pair. If the plurality of mesh nets are provided, namely if three or more mesh nets are provided, the plurality of mesh nets may be stacked in order from top to bottom. Here, the mesh nets facing each other in the vertical direction may be arranged such that the net shapes are mutually alternating in the vertical direction, similar to the first and second mesh nets 630, 670.

The first and second mesh nets 630, 670 will be described in detail again.

Detailed specifications of the first mesh net 630 and the second mesh net 670 are shown in Table 1 below.

TABLE 1

| kind of mesh net (Plain Weave) | wire diameter of mesh net (mm) | unit net pore diameter of mesh net (mm) | porosity (%) | spacing between first and second mesh nets (mm) | flame passing |
|---|---|---|---|---|---|
| 20 | 0.457 | 0.81 | 41 | 1 | O |
|  |  |  |  | 2 or above | X |
| 30 | 0.355 | 0.49 | 33.5 | 1 | O |
|  |  |  |  | 2 or above | X |

As shown in Table 1, the mesh nets (the first mesh net 630 and the second mesh net 670) may be made of Plain Weave 20 or 30.

First, if the mesh nets (the first mesh net 630 and the second mesh net 670) are made of Plain Weave 20, wires of the net structure may have a diameter of 0.457 mm and a unit net pore of the net structure may have a diameter of 0.81 mm. Also, the overall net structure may have porosity of 41%.

And, if the mesh nets (the first mesh net 630 and the second mesh net 670) are made of Plain Weave 30, wires of the net structure may have a diameter of 0.355 mm, and a unit net pore of the net structure may have a diameter of 0.49 mm. Also, the overall net structure may have porosity of 33.5%.

In both cases of Plain Weave 20 and the Plain Weave 30, if a spacing between the first mesh net 630 and the second mesh net 670 is 2 mm or above, the flame may not pass out of the pack case 200. If fire occurs inside the pack case 200 of the battery pack 10 due to a short circuit or the like, flame and smoke may be generated inside the pack case 200. At this time, if the flame passes through the mesh unit 600 directly out of the pack case 200 in addition to the smoke, the fire may be rapidly spread due to the flame passing out of the pack case 200. Thus, the first mesh net 630 and the second mesh net 670 may disposed to be spaced apart from each other by at least 2 mm in order to so as to prevent the flame from passing.

The dust-protecting filter 690 is used to filter the foreign substances or the like and may be provided between the first mesh net 630 and the second mesh net 670. The dust-protecting filter 690 may employ a filter capable of filtering foreign substances such as dust of at least 10 μm.

The dust-protecting filter 690 may have a volume corresponding to the space between the first mesh net 630 and the second mesh net 670. In other words, the dust-protecting filter 690 may be sized to completely fill the space between the first mesh net 630 and the second mesh net 670. This is to more reliably prevent the foreign substances such as dust from passing through the space between the first mesh net 630 and the second mesh net 670.

The handle 700 is used to guide the delivery of the battery pack 10 by the user during the transportation of the battery pack 10 and may be provided at both side surfaces of the case cover 250.

The handle 700 may form a space groove S when the case body 230 and the case cover 250 are coupled. Seeing the structure of the handle 700 in more detail, one end of the handle 700 may be spaced a predetermined distance from the front surface of the case cover 250 to the rear of the case cover 250, and the other end of the handle 700 may be disposed at the rear surface of the case cover 250.

The handle 700 may be formed integrally with the case cover 250. Accordingly, in this embodiment, the handle 700 is integrally formed at the case cover 250, instead of being separately attached to the pack case 200, and thus it is possible to reduce cost and time for manufacturing the handle.

Hereinafter, the transportation of the battery pack 10 by using the handle 700 will be described in more detail.

Figure 9:
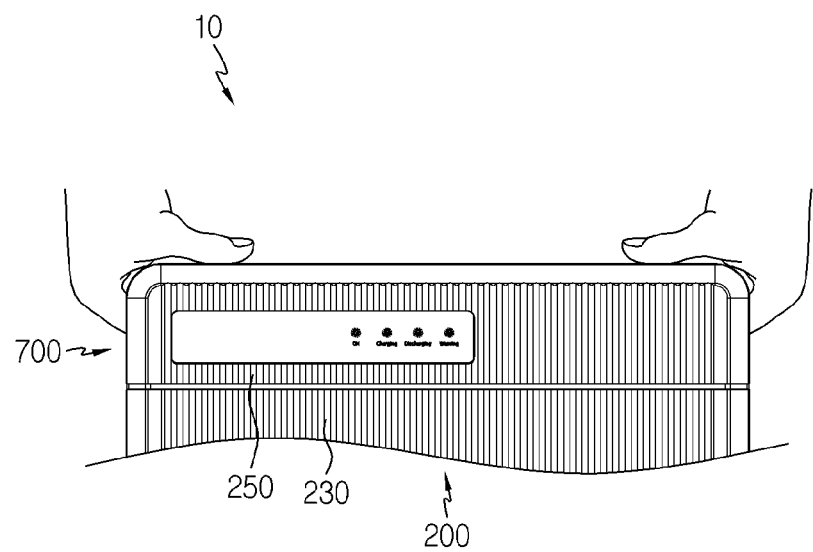
FIGS. 9 and 10 are diagrams for illustrating how to transport the battery pack of FIG. 1.
Figure 10:
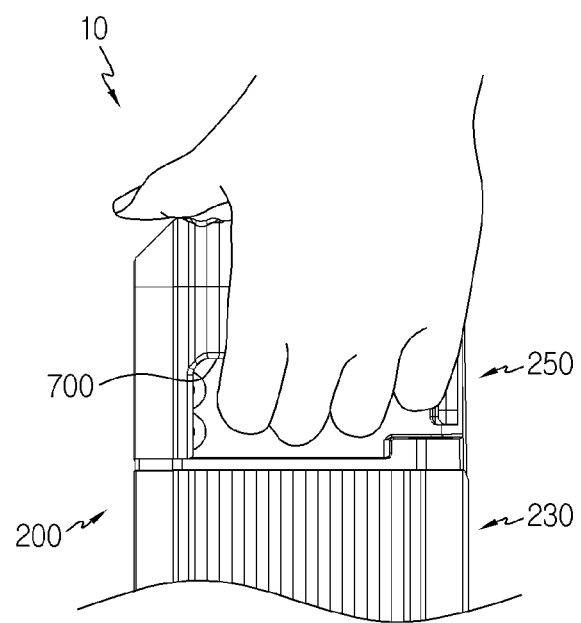

FIGS. 9 and 10 are diagrams for illustrating how to transport the battery pack of FIG. 1.

Referring to FIGS. 9 and 10, first, the handle 700 of the battery pack 10 is disposed in the space groove S and exposed only at both side portions and a rear portion of the battery pack 10, so that the handle 700 may not be exposed to the user at the front portion of the battery pack 700. In other words, the front portion of the battery pack 10 does not protrude, and thus the beauty of the battery pack 10 may not be deteriorated in an aesthetic point of view.

When the user or the like wants to move the battery pack 10, the user may put the hands into the space grooves S provided at both sides of the pack case 200, grab the handle 700 and then move the battery pack 10. Since the user or the like may transport the battery pack 10 by holding the handles 700 provided at both sides of the pack case 700, the battery pack 10 may be transported more reliably.

Figure 11:
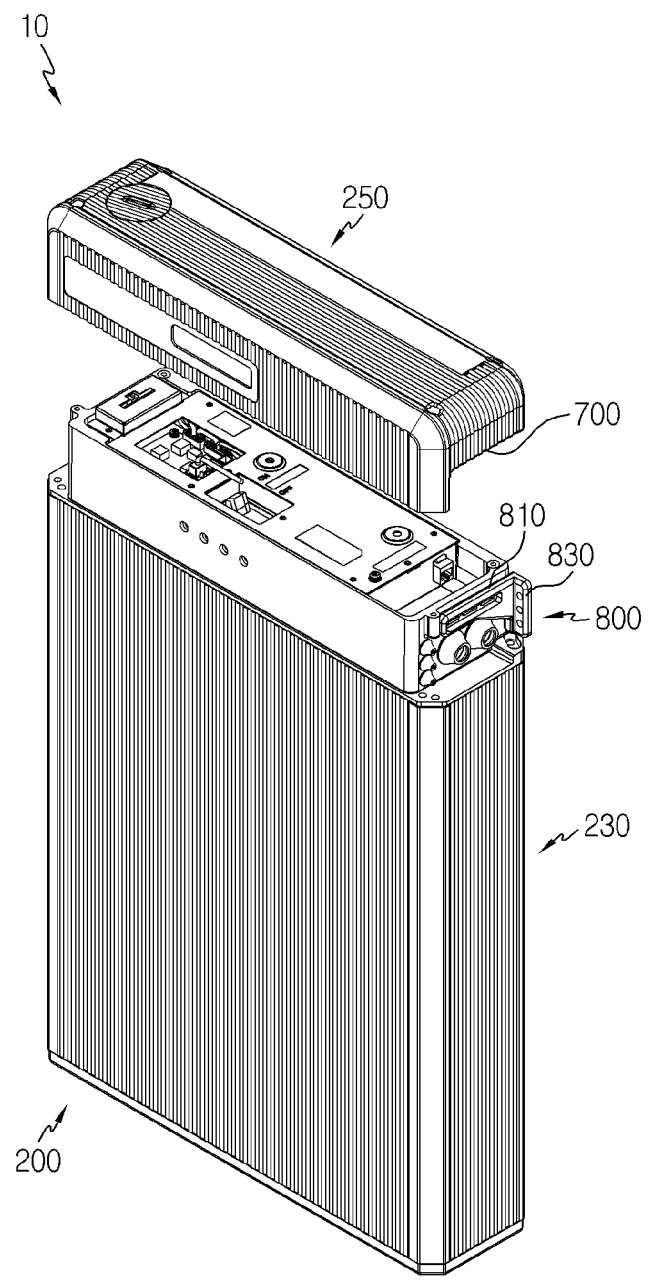
FIGS. 11 to 13 are diagrams for illustrating how to mount a mount bracket of the battery pack of FIG. 1.
Figure 12:
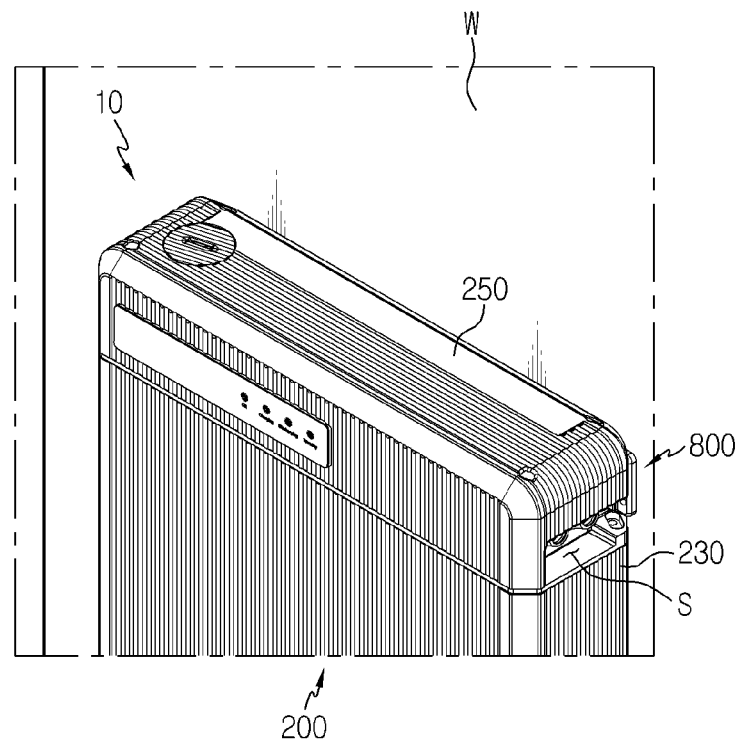
Figure 13:
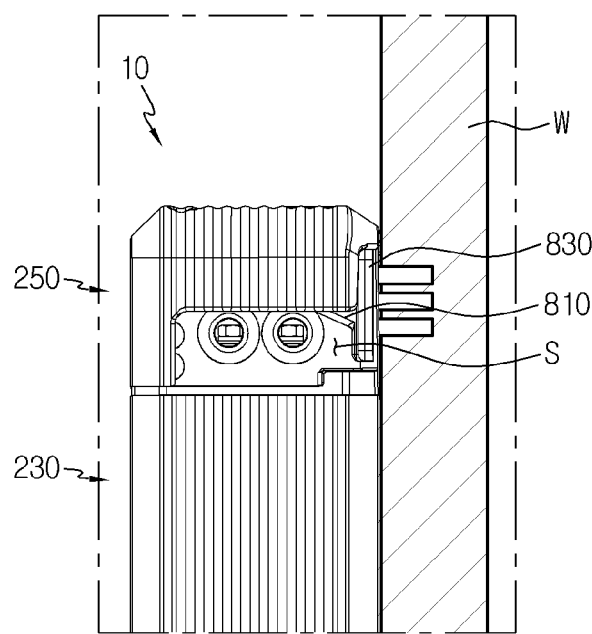

FIGS. 11 to 13 are diagrams for illustrating how to mount a mount bracket of the battery pack of FIG. 1.

Referring to FIGS. 11 to 13, the battery pack 10 may further include a mount bracket 800.

The mount bracket 800 is detachably mounted to the pack case 200 and may allow the battery pack 10 to be mounted to an exterior structure W. The exterior structure W may be, for example, a wall of a house. In other words, the mount bracket 800 may guide the battery pack 10 to be fixed in a wall-hanging manner.

The mount bracket 800 may include a pack mounting portion 810 and a structure mounting portion 830.

The pack mounting portion 810 is mounted to the pack case 200 by using a screw member or the like and may be disposed within the space groove S. The structure mounting portion 830 is bent from the pack mounting portion 810 and may be mounted to the exterior structure W by using the screw member or the like.

Meanwhile, the pack mounting portion 810 and the structure mounting portion 830 may be disposed within the space groove S. In other words, the mount bracket 800 may be disposed within the space groove S when mounted to the pack case 200. Accordingly, when being mounted to the pack case 10 and the exterior structure W, the mount bracket 800 may be hidden by the front surface of the case cover 250 in front of the battery pack 10. Thus, when the battery pack 10 is mounted in a wall-hanging manner, the mount bracket 800 is not observed in front of the battery pack 10 and thus may not hinder the aesthetic sense in terms of design.

As described above, the battery pack 10 of this embodiment may have a more airtight and efficient waterproofing and dustproofing structure by means of the above-mentioned structure. In addition, the battery pack 10 of this embodiment may be easily transported and installed by means of the above-mentioned structure and may secure an aesthetic sense in terms of design.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, the battery pack comprising:
   at least one battery module;
   a case base configured to support the at least one battery module;
   a case body coupled to the case base to accommodate the at least one battery module;
   a case cover coupled to the case body to cover the case body;
   a base mount extending from an upper surface of the case base, the base mount having an inclined upper surface and a step formed between the inclined upper surface and the upper surface of the case base; and
   drainage holes provided at both sides of the base mount,
   wherein the base mount has a length and width less than a length and width of the case base, and
   wherein the case base and the case body are sealed to each other and the case body and the case cover are sealed to each other.

2. The battery pack according to claim 1, wherein the case body includes:
   a first inner case configured to fix the at least one battery module;
   an outer case configured to surround the first inner case and form an accommodation space for accommodating the at least one battery module; and
   a second inner case mounted to an upper side of the outer case and coupled to the case cover.

3. The battery pack according to claim 1, further comprising:
   at least one mesh unit mounted to the drainage hole.

4. The battery pack according to claim 3, wherein the at least one mesh unit includes:
   a first mesh frame mounted to an upper side of the drainage hole;
   a first mesh net mounted to the first mesh frame;
   a second mesh frame mounted to a lower side of the drainage hole; and
   a second mesh net mounted to the second mesh frame and disposed opposite to the first mesh net.

5. The battery pack according to claim 4, wherein the first mesh net and the second mesh net are arranged with mutually alternating net structures.

6. The battery pack according to claim 4, wherein the first mesh net and the second mesh net are spaced apart from each other by at least 2 mm.

7. The battery pack according to claim 4, wherein the at least one mesh unit includes a dust-protecting filter provided between the first mesh net and the second mesh net.

8. The battery pack according to claim 7, wherein the first mesh net and the second mesh net are spaced apart from each other to create a space, and
   wherein the dust-protecting filter has a volume corresponding to the space between the first mesh net and the second mesh net.

9. The battery pack according to claim 8, wherein the dust-protecting filter filters off foreign matter including dust with a size of 10 µm or above.

10. The battery pack according to claim 1, wherein the battery pack is a home energy storage device.

11. The battery pack according to claim 1, wherein the case base has an upstanding rim so that a channel is formed between the rim and base mount.

* * * * *